INVENTORS:
FOSTER L. GRAY
RODNEY A. ROQUES

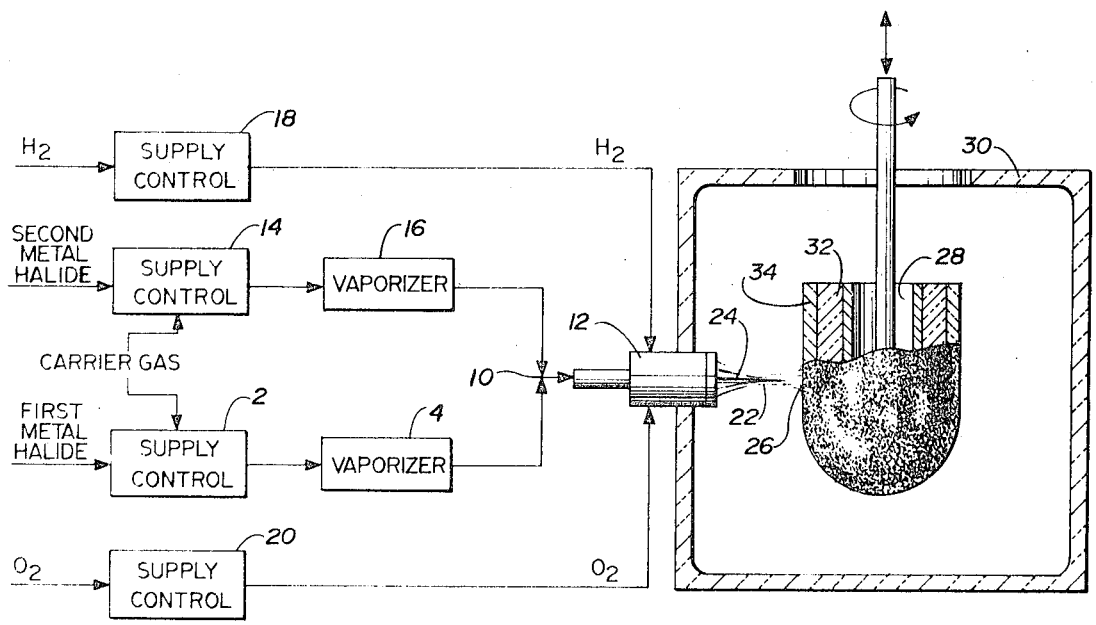
FIG. 1
FIG. 2
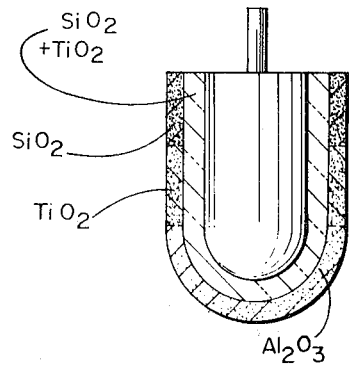
FIG. 5
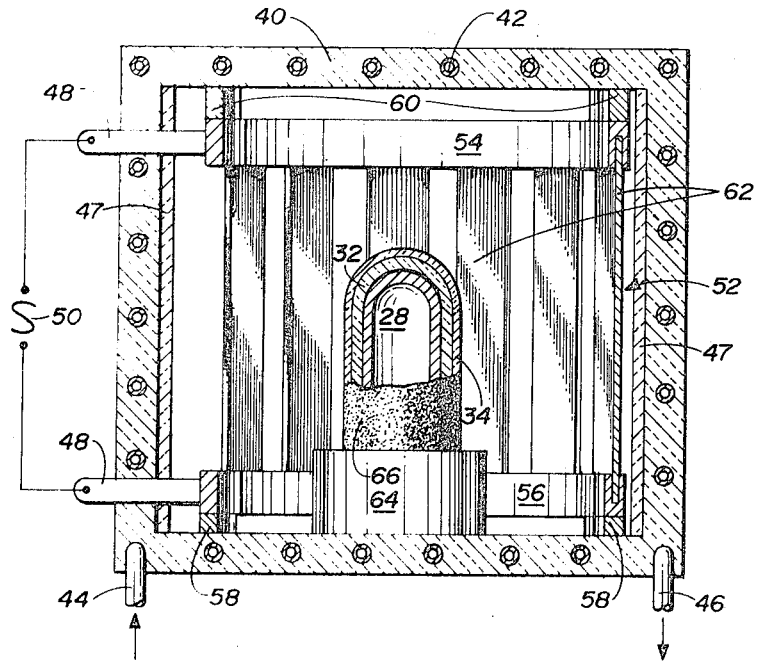
INVENTORS:
FOSTER L. GRAY
RODNEY A. ROQUES

United States Patent Office 3,644,607
Patented Feb. 22, 1972

3,644,607
USE OF VAPOR PHASE DEPOSITION TO MAKE FUSED SILICA ARTICLES HAVING TITANIUM DIOXIDE IN THE SURFACE LAYER
Rodney A. Raques and Foster L. Gray, Dallas, Tex., assignors to Texas Instruments Incorporated, Dallas, Tex.
Filed Dec. 18, 1969, Ser. No. 886,252
Int. Cl. C04b *41/32, 35/14;* C23c *11/08;* B28b *11/04*
U.S. Cl. 264—60                                    4 Claims

ABSTRACT OF THE DISCLOSURE

An article composed of a metal oxide having a composition of two or more metal oxides the concentration of which can preferentially or selectively be varied throughout its thickness. The method for making the article includes vapor phase hydrolysis of a metal halide deposition of the resultant metal oxide onto a deposition surface. In an exemplary mode silicon dioxide is deposited on a deposition mandrel until a predetermined thickness is laid down. Thereafter a mixture of silicon dioxide and titanium dioxide are deposited on the previously built-up silicon dioxide layer. The metal oxide article thus formed is a porous, amorphous structure. For most uses this structure is then sintered to form a fused metal oxide structure. This method of forming an article allows preferential variance of the thermal expansion of a fused silica crucible or tube throughout its wall thickness.

---

This invention relates to the manufacture of metal oxide structures, and more particularly to metal oxide articles composed of a plurality of metal oxides having a selectively varied composition throughout its wall structure.

Various methods for producing metal oxide articles are known to the art. For instance, U.S. Pat. 2,272,342, issued Feb. 10, 1942, discloses the production of a metal oxide article, particularly silica, by the vaporization of a metal halide and decomposition of the resulting vapor in a flame. The flame is then impinged on a refractory core to deposit a layer of metal oxide which is thereafter vitrified by the application of high temperature. This method is commonly known as vapor phase hydrolysis. A hydrolysis torch of the type disclosed and claimed in the copending applications of Michael A. Carrell, Ser. No. 744,188, filed July 11, 1968 (TI–3269) and Herbert J. Moltzan, Ser. No. 744,153, filed July 11, 1968 (TI–3326) are suitable for the practice of this invention. These torches can be operated in the manner disclosed in the copending application of Carl M. Skoogland, Jr., Ser. No. 808,894, filed Mar. 20, 1969 (TI–3422). Metal articles formed in this manner are amorphous, porous metal oxide articles or structures. These structures have considerable "green strength." They must be subjected to further heat treatment in order to densify the metal oxide into a transparent vitreous metal oxide structure.

In the vapor phase hydrolysis method of producing metal oxide articles, the flame of the hydrolysis torch is directed toward a suitable deposition structure, commonly referred to as a mandrel. A suitable mandrel for use with this invention is disclosed in the copending application of R. Bruce Biddulph, Ser. No. 799,891, filed Feb. 17, 1969 (TI–3327), although others may be utilized as desired.

Most commonly, fused silica articles are formed using vapor phase hydrolysis by vaporizing silicon tetrachloride and hydrolyzing the chloride in a flame of elemental hydrogen and oxygen according to the following reaction:

$$SiCl_4 + 2H_2 + O_2 \rightarrow SiO_2 + 4HCl$$

The vapor phase hydrolysis method of producing silicon dioxide articles can also be used to produce other metal oxide structures. For example, titanium dioxide and aluminum oxide articles are produced according to the following reactions:

$$4AlCl_3 + 6H_2 + 3O_2 \rightarrow 2Al_2O_3 + 12HCl$$

$$TiCl_4 + 2H_2 + O_2 \rightarrow TiO_2 + 4HCl$$

Other metal oxides may also be produced by this method including the oxides of those metals appearing in groups II, III, IV and V, particularly Groups II–A, III–A, IV–A, III–B, IV–B and V–B, of the Periodic Table, as it appears on the flyleaf of Perry's Chemical Engineers' Handbook, edited by R. H. Perry, C. H. Chilton and S. D. Kirkpatrick, 1963, McGraw-Hill Book Co., Inc., New York. Various metal halides can be employed; metal chlorides are preferred.

For certain applications it is desirable to possess a metal oxide article which has a varied composition throughout its wall structure. For example, a fused silica tube has a very low coefficient of thermal expansion. For a given use it is desirable to have the outer layer of the fused silica tube in compression while the inner portion of the tube is in neither a compression nor tension state. Such a mechanical structure would have not only an increased resistance to thermal shock, but also an inherently higher mechanical strength. For example, if the tube were hot and if it were suddenly placed in an environment where the temperature was a few hundred degrees centigrade lower, the exterior wall of the tube being in compression would first have to release these internal forces before any expansion of the exterior wall could take place. This mechanical phenomenon would serve two purposes. First, as the exterior wall of the tube would not shatter or haze as would a tube which was not prestressed. Secondly, the external wall structure would absorb most of the thermal shock. Since fused silica has a very low thermal conductivity, the interior would be allowed to contract at a rate compatible with the outer wall, thus preventing shattering of that portion of the tube.

Methods known for conditioning metal oxide articles include thermal strengthening and a surface ion exchange process. In the thermal strengthening method, a glass tube is rapidly cooled on its exterior surface while maintaining the internal portion of the tube at a higher temperature. The internal portion of the tube is then cooled slowly placing the exterior wall portion of the tube in compression as the interior portion cools and contracts. Thus, a thermally conditioned glass tube is produced. With the surface ion exchange method a fused metal oxide article is placed in an ion exchange bath wherein larger (alkali) ions from the bath penetrate the outer surface of the tube and replace smaller ions to obtain preferential expansion of the article surface as desired. Of course, the expansion or contraction of the surface of the metal oxide article depends upon the particular metal ions composing the article and also the type of ion which is penetrating the exterior surface of the metal oxide tube or article. This process is sometimes referred to as "crowding" or "ion stuffing." Both of these prior methods have disadvantages including difficulty of controlling the final or resultant product. They also involve a time consuming and expensive production step. Additionally, these prior art processes for thermal conditioning of metal oxide articles are secondary operations on the final metal oxide articles.

It is, therefore, desirable to strengthen or otherwise condition a metal oxide article as the article itself is being produced. In addition, it is desirable to selectively control in a predetermined manner the composition of a metal oxide article. Further, it is desirable to very precisely control the resultant mechanical and thermal properties of a metal oxide article. The invention therefore includes a process for manufacturing a metal oxide article comprising depositing a first metal oxide on a deposition surface by vapor phase hydrolysis and selectively depositing at least a second metal oxide on a deposition surface by vapor phase hydrolysis. The invention also includes the article thereby produced.

The invention will be more fully understood with reference to the drawings in which:

FIG. 1 is a schematic representation of the apparatus and method utilized to manufacture composition metal oxide structures.

FIG. 2 is a schematic representation of a sintering or vitrifying furnace in which the amorphous, porous metal oxide structure produced by the apparatus of FIG. 1 is sintered, producing a fused metal oxide article.

FIG. 5 is an illustration of one of the many metal oxide articles which can be produced by this invention.

Figures 3, 4:
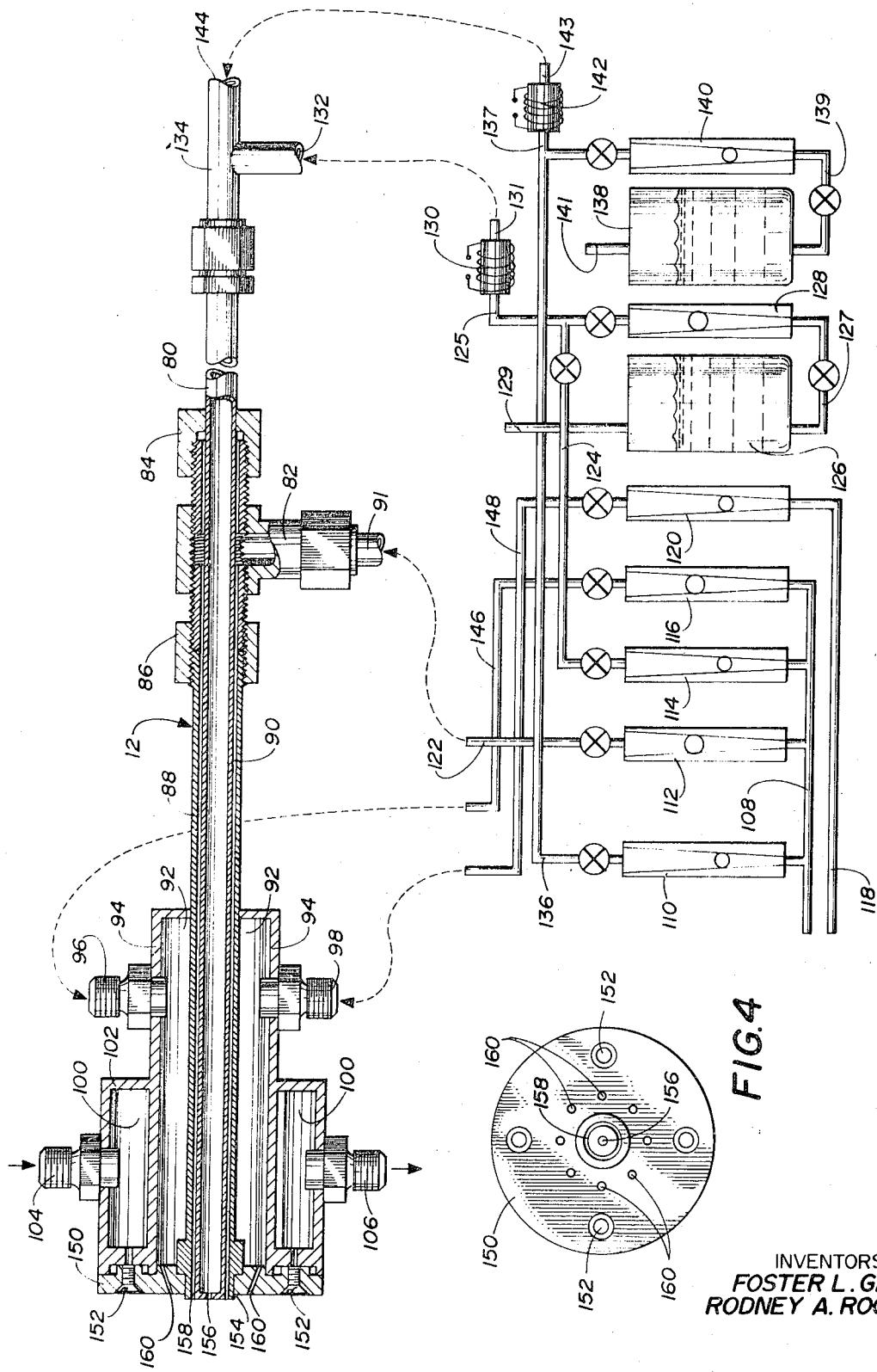
FIG. 3 is a partially schematic representation and partial cross-sectional view of a torch and associated apparatus for use with the instant invention.
FIG. 4 is a front view of the torch of FIG. 3.

Referring now to FIG. 1, a liquid metal halide is fed from a suitable reservoir into a supply control apparatus 2 in which it is mixed with a carrier gas. The two-phase mixture of carrier gas and liquid metal halide is then fed to a vaporizer 4 where the metal halide is evaporated. The vaporous mixture of metal halide and carrier gas is then fed into a T-connection at 10 and subsequently into hydrolysis torch 12.

Similarly, a second liquid metal halide is fed through a second supply control apparatus 14 at a predetermined variable rate. The second metal halide is mixed with the carrier gas, and the two-phase mixture is fed into a vaporizer 16. The metal halide is evaporated in vaporizer 16 and the resulting vaporous mixture is fed into T-connection 10, from which it enters torch 12. The vaporous metal halides are admixed at the T-connection 10 before they enter torch 12.

In addition to the metal halide compositions, a supply of elemental hydrogen and elemental oxygen are metered to torch 12 through supply controls 18 and 20, respectively. The hydrogen and oxygen are ignited to form a flame 22; the metal halides are ejected from the torch 12 in a stream 24. Other fuels can also be used with the hydrolysis torch, for example, those combustible hydrocarbons having a boiling point generally above that of unleaded gasoline. As the vaporous metal halide stream and the flame contact, the metal halide is hydrolyzed to a metal oxide. The flame is directed toward a deposition surface 26. Initially the deposition of metal oxides is begun on a mandrel 28 which is rotating and translating to fully cover the mandrel surface with metal oxide. Thereafter the metal oxide is deposited on a previously deposited layer of metal oxide. The term deposition surface includes both a mandrel and a layer of metal oxide. The mandrel can be graphite or any other suitable deposition material. The mandrel can be flat, circular in cross section, or any other desired shape capable of receiving a metal oxide deposit.

If desired, the mandrel 28 and torch 12 can be located in an enclosure 30. The enclosure can be maintained at a predetermined temperature. As shown in FIG. 1, a layer 32 of the first metal oxide is formed on the circular mandrel 28 as it rotates. During this initial deposition, none of the second metal oxide is fed from supply control 14 into torch 12. When a desired or predetermined layer of first metal oxide has been formed on the mandrel, a mixture of the second metal halide and carrier gas is fed from supply control 14 into torch 12. This results in a layer 34 composed of a homogeneous mixture of a first and second metal oxide. As can readily be seen, any desired metal oxide structure can be produced.

In the foregoing embodiment of this invention, the vapor hydrolysis torch 12 is operated at a temperature sufficient to hydrolyze the metal halides being fed into the flame. However, the torch is not operated at a temperature sufficient to completely sinter or vitrify the metal oxide being deposited on the mandrel 28. The torch is operated at such a temperature to deposit an amorphous, partially sintered, metal oxide on the mandrel. The mandrel temperature of this embodiment would preferably never reach a temperature over about 300° C. Likewise, the metal oxide is preferably never brought above its fusion temperature as it is deposited on the mandrel or previously deposited metal oxide.

In the embodiment illustrated in FIG. 1, the mandrel 28 with its deposited metal oxide layers 32 and 34 is removed from the enclosure 30 and inserted in a sintering or vitrifying furnace such as that shown in FIG. 2. The mandrel 28 shown in partial cross section is positioned in a sintering furnace 40. The furnace 40 can be composed of a suitable refractory material or can be manufactured of steel with a graphite liner. Cooling coils 42 are positioned in the wall of the furnace 40 and are fed through conduit 44 with a suitable coolant, for example, water. The coolant is withdrawn from the coils 42 through conduit 46. The furnace is lined with a suitable insulating material 47. Electrodes 48 are inserted through the wall of the furnace 40 and connected to a controllable electrical energy source shown as 50. A heating element 52 comprises two rings 54 and 56 positioned in the top and bottom of the furnace, respectively. The lower ring rests on supports 58 while the upper ring 54 is supported from the top wall of the furnace by supports 60. Graphite ribbons or heating tapes 62 are electrically connected to and between rings 54 and 56. When the electrodes are connected to the controlled energy source 50, the heating tapes 62 raise the temperature in the furnace to a sufficient level to densify or vitrify the metal oxide article. For example, the vitrifying temperature of a silicon dioxide article would be in the range of about 1500° C. to 1800° C. The mandrel 28 is positioned on a support 64 which in turn rests on the floor of the furnace 40. As the amorphous, porous metal oxide is fused, it shrinks and densifies to form a vitreous, fused metal oxide structure. The composite layers of the metal oxide structure 32 and 34, although reduced in thickness, maintain a layered formation. The two layers are not discrete, but are integrally fused to form a unitary metal oxide structure.

In a preferred embodiment of this invention the above procedure can be utilized to manufacture an article composed of silicon dioxide and titanium dioxide. Silicon tetrachloride is fed into supply control 2 and hence to the torch 12 where it is hydrolyzed to silicon dioxide. In the same manner, titanium tetrachloride is fed to supply control 14 and torch 12 where it is hydrolyzed to titanium dioxide. A layer of silicon dioxide is first deposited as layer 32. Thereafter a second layer 34 comprising a mixture of titanium dioxide and silicon dioxide is deposited. For a silicon dioxide and titanium dioxide mixture, the vitrifying temperature would be somewhat lower than for pure silicon dioxide, dependent upon the amount of titanium dioxide in the mixture. For example, for a mixture of silicon dioxide containing less than about 1% by weight of titanium dioxide, the vitrifying temperature would be near about 1500° C.

A silicon dioxide/titanium dioxide article formed by the procedures illustrated in FIGS. 1 and 2 and described above will exhibit excellent thermal shock resistance. This is due to the fact that a mixture of, for example, 99% silicon dioxide and 1%, by weight, titanium dioxide has a thermal coefficient of expansion less than that of pure silicon dioxide. As the composite structure illustrated as 66 in FIG. 2 is cooled from its vitrifying or densifying temperature down to ambient, the interior portion 32 of tube 66 containing pure silicon dioxide will contract more than the exterior portion 34 of the tube which contains a mixture of silicon dioxide and titanium dioxide. In a preferred structure, the inside layer of the metal oxide article is composed of silicon dioxide while the outer layer is composed of silicon dioxide containing less than 10% by weight and preferably less than about 1% by weight of titanium dioxide.

An example of the type of torch which can be utilized to effect the method or process of this invention to produce a composite metal oxide article is illustrated in FIGS. 3 and 4. Referring to those figures, tube or pipe 80, preferably constructed from stainless steel, extends through the length of the torch 12 to provide a passage for vaporized metal halide entrained in a carrier gas. A T-connection, designated generally by the numeral 82, is connected about the tube 80 and is sealed at one end to the tube 80 by a collar member 84. A coupling member 86 fits over a stainless steel tube 88 to provide an annular sheath chamber 90 between the tube 80 and tube 88. An inlet portion 91 of the T-connection 82 is connected to the source of sheath gas in a manner to be later described, which here can be oxygen containing gas. This sheath gas is passed into the annular sheath chamber 90.

A mixing chamber 92 is formed by chamber walls 94. An inlet fitting 96 is adapted to be connected to a source of a first combustible gas, while the inlet 98 is connected to a source of a second combustible gas. The combustible gases are mixed within the chamber 92 in order to limit any possible flashback to the torch housing. An outer annular chamber 100 is formed by annular walls 102 to define the cooling chamber about the torch. An inlet fitting 104 is connected to a suitable supply of cooled fluid which is circulated through the chamber 100 and exhausted via an outlet fitting 106.

Oxygen is supplied through a conduit 108 to the inlet of four flowmeters 110, 112, 114, and 116. Hydrogen is supplied via a conduit 118 to a flowmeter 120. Both the oxygen and hydrogen are dried prior to entering the flowmeters. Suitable valves are provided at the output of each of the flowmeters in order to allow accurate regulation of the flow rate of the gases to the torch. Oxygen is supplied throguh a conduit 122 to the inlet portion 91 of the T-connection member 82 from flowmeter 112. Oxygen is supplied from the flowmeter 116 through a conduit 146 to the inlet 96 of the mixing chamber 92. Hydrogen is supplied from the flowmeter 120 through the conduit 148 to the inlet 98 of the mixing chamber 92.

Oxygen from the flowmeter 114 is supplied through a conduit 124 to conduit 125. Liquid silicon tetrachloride, for example, contained in reservoir 126 is supplied through conduit 127, through a suitable valve and into flowmeter 128. The liquid silicon tetrachloride in reservoir 126 is maintained at a constant pressure by supplying an inert gas from a suitable constant pressure source through conduit 129. The liquid silicon tetrachloride is fed into conduit 125 from flowmeter 128 where it combines wih oxygen carrier gas from conduit 124. The two phase silicon tetrachloride and oxygen carrier enter a conventional vaporizer 130 where the liquid phase is vaporized. The vaporous oxygen/silicon tetrachloride mixture is then fed into T-connection 134 through inlet 132 via conduit 131. Similarly, oxygen from flowmeter 110 is supplied through a conduit 136 to conduit 137. Liquid titanium tetrachloride, for example, contained in reservoir 138 is fed through conduit 139 and a suitable valve arrangement to flowmeter 140. The liquid titanium tetrachloride in reservoir 138 is kept under constant pressure to assure a uniform flow rate by an inert or other non-reactive gas, for example, nitrogen, from a suitable constant pressure source. The inert gas is fed into the reservoir 138 through conduit 141. The liquid titanium tetrachloride combines with the oxygen carrier gas in conduit 137 and the two phase mixture enters vaporizer 142 where the liquid titanium tetrachloride is vaporized. The gaseous mixture is then fed through conduit 143 into T-connection 134 via inlet 144. The vaporous silicon tetrachloride and vaporous titanium tetrachloride are admixed in the T-connection 134 and enter the torch through pipe 80. As can be readily seen, the ratio of silicon tetrachloride to titanium tetrachloride can be easily varied according to a predetermined schedule. The composition of the porous, amorphous metal oxide article thus laid down can be varied from, for example, a pure silicon dioxide to a mixture of silicon dioxide and titanium dioxide.

A nozzle assembly 150 is attached to the face of the torch 12 by screws 152. As shown in FIGS. 3 and 4, four screws 152 pass through the nozzle assembly 150 and into portions of the walls defining chamber 100. Nozzle 150 comprises a unitary circular member having a center opening 154 for receiving the end of pipe 80. As best shown in FIG. 3, the end of pipe 80 is closed, with the exception of a center nozzle aperture 156 defined therein. Due to the difference in the diameters of pipe 80 and pipe 88, an annular opening 158 is defined concentrically about the nozzle aperture 156. The sheath chamber 90 opens into the opening 158. A plurality of nozzle openings 160 are defined through the nozzle assembly 150. The diameter of these openings is generally the same, or smaller than, the diameter of the nozzle aperture 156.

In operation of the torch 12, silicon tetrachloride and titanium tetrachloride entrained in carrier gas are passed through the pipe 80 and out the jet aperture 156 as a gaseous jet stream. A concentric sheath of oxygen is passed through the annular opening 158. Eight streams of a combustible mixture of hydrogen and oxygen are directed at an angle toward the axis of the jet stream for penetration of the gas sheath and interaction with the gaseous metal chloride mixture. When the torch is ignited, combustion occurs at this region and the silicon tetrachloride and titanium tetrachloride are decomposed by vapor phase hydrolysis to form silicon dioxide and titanium dioxide.

To better understand the method by which metal oxide articles or structures are produced in accordance with the invention described above, an exemplification follows.

EXAMPLE

Two torches of the type disclosed and described in conjunction with FIGS. 3 and 4 above are radially spaced and positioned in an insulated enclosure constructed of an asbestos material sheathed with stainless steel. A rotatable and translatable graphite mandrel of right circular cross section is inserted through an access opening in the top of the enclosure. Elemental hydrogen and oxygen are used as the combustible gases and are metered to the torch at flow rates of 30 liters per minute and 5.2 liters per minute, respectively. The sheath gas, oxygen, is metered to the sheath gas chamber at a flow rate of 1.0 liter per minute. Liquid silicon tetrachloride (B.P. 57.6° C.) is combined with oxygen carrier gas in a proportion of 0.118 mole per minute of silicon tetrachloride to 0.025 mole per minute of oxygen. The mixture is completely vaporized and conducted to the torch. Burning the elemental hydrogen and oxygen in the presence of vaporous silicon tetrachloride converts it to silicon dioxide. The two torches are positioned to direct the flame toward the axis of a rotating mandrel to deposit the thus formed silicon dioxide on the mandrel. The operating temperature of the torch is about 1700° C. The maximum temperature reached by the mandrel is about 300° C. Silicon dioxide is deposited on the mandrel for approximately two hours at the above specified flow rates creating a deposit about two inches thick.

At this point liquid titanium tetrachloride is combined with oxygen carrier gas at a flow rate of 0.018 mole per minute and 0.025 mole per minute of oxygen, respectively. The mixture is vaporized and conducted to the torch. The titanium tetrachloride (B.P. 136.4° C.) is converted to titanium dioxide and co-deposited with silicon dioxide to form a composite layer of titanium dioxide and silicon dioxide. This procedure is continued for about 15 minutes to form an oxide layer having a total thickness of about 2.25 inches. The flow of tetrachlorides is cut off and the hydrogen/oxygen flame is allowed to burn until the outer surface of the deposit is glazed.

The mandrel along with its deposit of metal oxides is removed from the vapor phase hydrolysis enclosure and inserted in a sintering furnace. The metal oxide is fused in the furnace at temperatures ranging from about 1400° C. to about 1500° C. After remaining in the furnace for approximately 15 minutes at a peak temperature within the range above, the metal oxide on the mandrel has shrunk to an average wall thickness of about 0.25 inch. The silicon dioxide and titanium dioxide are fused. The mandrel with its fused, tubular coating is removed from the sintering furnace and is cooled to room temperature. The cooled, fused metal oxide tube is then separated from the mandrel. The outer surface of the tube has a blue tinted portion indicating the presence of titanium dioxide. The material of the tubular structure exhibits superior thermal shock resistance when compared to a similar tube composed only of silicon dioxide. In addition, the tube has a higher impact strength than does a similar tube of pure silicon dioxide.

The present invention can be utilized to prepare and manufacture a variety of shapes and sizes of metal oxide structures. A tubular structure has been illustrated but is only exemplary, as rectangular and other geometric structures can be manufactured. Any combination of compositions can be achieved by simply varying the proportions of metal halides introduced to the vapor phase hydrolysis torch. For example, a tubular structure having an inner portion composed of aluminum oxide and silicon dioxide and having an outer portion of pure silicon dioxide can be manufactured. In addition, flat substrates of a composite metal oxide can be selectively coated with first a strip of pure silicon dioxide, an adjacent layer can be composed of titanium dioxide and still an adjacent layer can be composed of aluminum oxide. An example of this type of structure is illustrated in FIG. 5, in which is illustrated a composite metal oxide article having an inner layer of a first material with three separate outside layers of different composition deposited thereon.

As previously set forth, any metal oxide structure producible by vapor phase hydrolysis can be manufactured by the procedures of this invention. Among the metal oxides which can be formed are those containing metals from Groups II–A, III–A, IV–A, III–B, IV–B and V–B of the Periodic Table. Specifically preferred oxides are titanium dioxide, silicon dioxide and aluminum oxide. Of course, the desired end use of the metal oxide articles of this invention is what ultimately determines its final composition and structure.

The metal oxide articles of this invention have a variety of uses, including strengthened structures for deep submergence vehicles, diffusion tubes with greater high temperature strength, radomes with increased impact strength, fused silica pipes exhibiting increased corrosion resistance, and laboratory ware having improved thermal shock resistance.

While the foregoing specification has described and illustrated a preferred mode of operating the instant invention, the latter is not intended to be limited either in spirit or scope other than by the appended claims.

What is claimed is:

1. A method for producing a fused, composite, metal oxide article comprising:
  depositing a first porous layer consisting essentially of silicon oxide on a first deposition surface by vapor phase hydrolysis,
  depositing a second porous layer composed of at least about 99% silicon oxide and a minor amount of up to about 1% titanium dioxide on said first porous layer by vapor phase hydrolysis, and
  sintering the metal oxides thus deposited to form a dense, fused, metal oxide structure.

2. The method of claim 1 wherein the first deposition surface is a tubular deposition mandrel.

3. The method of claim 2 wherein said second porous layer is comprised of a homogeneous mixture of silicon dioxide and titanium dioxide.

4. The method of claim 3 wherein said second layer comprises about 1% by weight of titanium dioxide and about 99% by weight of silicon dioxide.

References Cited

UNITED STATES PATENTS

| | | | |
|---|---|---|---|
| 3,481,781 | 12/1969 | Kern | 117—106 |
| 3,460,926 | 8/1969 | Weaver | 264—81 |
| 2,272,342 | 2/1942 | Hyde | 264—332 |
| 3,423,324 | 1/1969 | Best et al. | 23—182 |
| 3,223,552 | 12/1965 | Sakurai et al. | 264—81 |
| 3,415,631 | 12/1968 | Ault et al. | 264—60 |
| 3,511,703 | 5/1970 | Peterson | 117—106 |
| 3,534,131 | 10/1970 | Gebler et al. | 264—65 |

DONALD J. ARNOLD, Primary Examiner

J. H. MILLER, Assistant Examiner

U.S. Cl. X.R.

106—52, 69; 117—106 A, 107.2 R; 264—65, 81, 332